United States Patent [19]
Crawford et al.

[11] Patent Number: 5,978,008
[45] Date of Patent: Nov. 2, 1999

[54] AUTOMATIC COLOR CORRECTION FOR A WHITE-LIGHT PRINTER

[75] Inventors: Timothy R. Crawford, Needham; Joseph V. Demarinis, Winchester, both of Mass.

[73] Assignee: Polaroid Corporation, Cambridge, Mass.

[21] Appl. No.: 08/562,202

[22] Filed: Nov. 22, 1995

[51] Int. Cl.[6] ......................................... B41J 2/435
[52] U.S. Cl. ............................................. 347/230
[58] Field of Search .................... 347/230, 229, 347/226, 246; 355/20, 38, 68, 77; 358/527

[56] References Cited

U.S. PATENT DOCUMENTS

| | | | |
|---|---|---|---|
| 4,694,355 | 9/1987 | Constable | 358/332 |
| 4,694,356 | 9/1987 | Constable | 386/42 |
| 4,740,820 | 4/1988 | Endo | 355/20 |
| 4,769,677 | 9/1988 | Matsumoto | 355/38 |
| 5,182,594 | 1/1993 | Hopson | 355/20 |
| 5,349,418 | 9/1994 | Hopson | 355/20 |
| 5,424,802 | 6/1995 | Saita | 355/43 |

FOREIGN PATENT DOCUMENTS

| | | | |
|---|---|---|---|
| 0198532 | 10/1986 | European Pat. Off. | H01J 29/56 |
| 0235856 | 9/1987 | European Pat. Off. | H01J 29/56 |
| 04330896 | 11/1992 | Japan | H04N 17/04 |
| 07295104 | 11/1995 | Japan | G03B 27/32 |

Primary Examiner—Adolf Berhane
Attorney, Agent, or Firm—Joseph Stecewycz

[57] ABSTRACT

A method and apparatus for compensating for color and brightness variations in a white-light printer is described where the white-light printer automatically adjusts exposure of a photosensitive medium to optimize a printed image thereon. The white-light printer generates compensation factors used by the white-light printer to individually correct for primary colors within an image by monitoring chromatic transmission through the same or equivalent color filters as are being used to expose the photosensitive medium. A method is disclosed where the video output is set at maximum and brightness, or Luma, is varied and measured in foot-Lamberts. The Luma that gives "white", a film table is recorded, and that Luma is fixed such that proper white, black, and grays are attained. A similar procedure is repeated for each primary color, thereby compensating for color and brightness variations due to differing CRTs and the warm-up state of each CRT.

9 Claims, 7 Drawing Sheets

AUTOMATIC COLOR CORRECTION FOR A WHITE-LIGHT PRINTER

BACKGROUND OF THE INVENTION

The present invention relates generally to white-light printers for use as a computer peripheral, and, more particularly, the invention relates to white-light printers for printing onto photosensitive media which use photosensors within the white-light printer to monitor light output of the white-light printer thus providing enhanced exposure control.

Electronic printers have long been used with computers to print images from the computers. To do so, the computer transmits an image as image data representative of the image to the printer through a common interface, and this image data, usually in digital form, is interpreted by the printer such that the image is printed on a hard copy medium. When a photographic print is desired, a white-light printer is generally used and the hard-copy medium is a photosensitive medium. The white-light printer then uses a modulated light source to scan image-bearing light across the photosensitive medium to create an image thereon.

Commonly, the modulated light source is a cathode ray tubes ("CRT") which is a fast, accurate, and easy to modulate light. A problem with using a CRT for this purpose is that as the CRT screen warms, the color of the light emitted from the CRT can change. Therefore, in order to get consistent exposures, the CRT must be fully warmed requiring that the printer be turned on for an extended period of time prior to making a first print.

Further, as the CRT ages the light output and color of the light continues to change. This results in precise factory calibration for light and color output of the CRT becoming useless over a period of time.

A further problem with using a CRT in a printer is that each CRT gives off a different amount of light, even with a constant voltage input. This problem has been addressed in factory calibration by intensity measurement and initial adjustment to ensure accuracy. This accuracy comes at the expense of increased manufacturing time and costs, and may not be stable over the life of the equipment.

To solve this problem, commercially available white-light printers have placed a photosensor within the white-light printer to monitor light intensity, or brightness, of the CRT light output. The results from the sensor are fed back to a processor which compensates the image signal from the computer for changes in brightness. While this method of compensation addresses the problem of varying brightness, it ignores changes in color of the white light.

Accordingly, it is an object of this invention to provide a white-light printer that automatically compensates for color changes in the white light.

It is another object of this invention to compensate for light intensity changes irrespective of a CRT used within a CRT-based white-light printer.

It is a further object of the invention to decrease manufacturing time by automatically calibrating each white-light printer without requiring mechanical adjustments.

These and other objects of the invention will be obvious and appear hereinafter.

SUMMARY OF THE INVENTION

The aforementioned and other objects are achieved by the invention which provides a white-light printer that automatically adjusts exposure of the photosensitive medium to optimize a printed image thereon. The white-light printer generates compensation factors used by the white-light printer to individually correct for individual colors within an image. The white-light comprises processing means, a light source, filter means and sensor means.

The processing means receives an image signal from the computer where the image signal is representative of the image to be printed. It then translates the image signal into a light signal representative of a color component of the image compensated for exposure of the photosensitive medium by using the aforementioned compensation factors. The processing means transmits one color component of the image at a given time, for example one of either red, green or blue.

The light source is in electrical communication with the processing means. It projects the color component of the image as image-bearing light. Since the printer is a white light printer, the image-bearing light is representative of a color component of the image but is transmitted as white light.

The filter means is responsible for changing the white light of the image-bearing light into the proper color of the color component. It does so by selectively placing a filter associated with the color component of the image in an optical path between the light source and the photosensitive medium. In other words, if the color component transmitted by the light source is red then a red filter is placed in the optical path thus imaging red image-bearing light onto the photosensitive medium.

The sensor means is outside of the optical path that present the image onto the photosensitive medium. It is disposed behind the filter means but either away from the optical path or integrating only a small portion of the optical path. Since generally the filter means is a circular, rotatable filter wheel, the sensor means is located across a chord of the circle of the wheel. The filter wheel can then be rotated to selectively place a filter in front of the sensor such that the sensor can monitor output of image-bearing light from the light source through the filter and generate data necessary to calculate the compensation factors using the same filter as is used to print the image. Thus, the sensor can measure light intensity and color temperature within the white light of the white-light printer.

The aforementioned measurements are then communicated back to the processing means which records brightness and chromatic changes in compensation factors. The processing means uses this information to adjust exposure of the photosensitive medium, thus optimizing image output.

In further aspects the invention provides an apparatus in accordance with the method described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of white-light printers and may be embodied in several different forms, it is advantageously employed in connection with a cathode ray tube ("CRT") based printer. Though this is the form of the illustrated embodiment and will be described as such, this embodiment should be considered illustrative and not restrictive.

Figure 1:
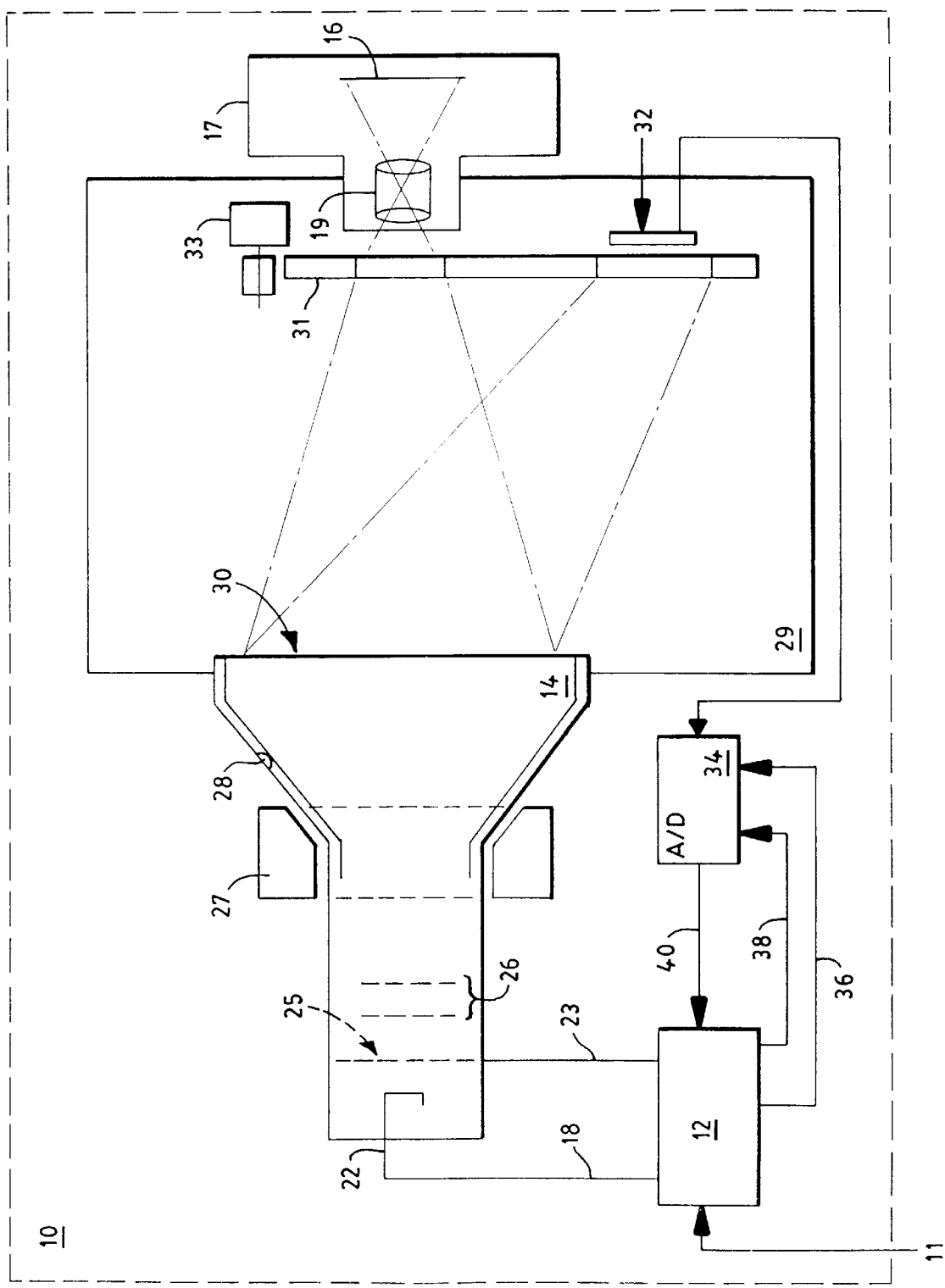
FIG. 1 shows a block diagram of a white-light printer in accordance with the invention.

Referring now to FIG. 1, a printer 10 is shown having a cable connection 11 for electrically communicating with a computer (not shown). The computer sends image data to the printer 10 via the cable connection 11, and the image data is passed into digital and analog electronics 12. The digital electronics 12 process the image data and transmit the image data to a cathode ray tube ("CRT") 14 which projects the image data onto a photosensitive medium 16 such that an image is formed thereon.

A CRT is an evacuated glass container having at one end a heated cathode 22 in an electron gun that projects a beam of electrons against a luminescent screen 30 at the opposite end of the tube. Electrons are emitted from the heated cathode 22 in the electron gun to produce a bright spot of light that appears wherever the electrons strike the screen. A control grid 25 having a negative potential with respect to the cathode, in conjunction with the cathode, modulates the electron beam. The electrons next pass through a series of doughnut shaped anodes signified generally as 26 which accelerate and focus the stream of electrons so that they strike the luminescent screen 30 as a fine point. An anode 28 provides the final acceleration of the electrons. Depending upon the implementation, there are either two sets of electric deflecting plates or two sets of magnetic deflecting coils 27 between the electron gun and the screen.

In CRTs containing electric deflecting plates, a mechanically horizontal pair of plates control the up and down motion of the electric beam, and a mechanically vertical pair controls the left to right motion of the beam. If the voltages applied the plates of each pair are equal in value, the beam will strike the center of the luminescent screen. If the voltages are unequal, the electron beam will be deflected. The amount of deflection depends on the differential voltage applied to the plates. As the signal applied to the horizontal plates vary, so will the spot of light on the face which will move up or down in response to the changes in voltage. If the voltage of the vertical plates is varied, the beam of electrons can be made to sweep horizontally across the face of the tube. Magnetic deflecting coils 27 as that shown in the illustrated embodiment work in an analogous manner except that the electron beam is deflected by variations in the strength of magnetic fields through which it must pass.

In the printer 10, the electronics 12 pass a modulated signal 18 to the cathode 22 such that the cathode 22 emits a beam of electrons that varies proportionally to the modulated signal 18. The brightness of the electron beam as it appears on the luminescent screen 30 is governed by the luma control signal 23 and video signal 18. This luma control signal 23 is varied by the electronics 12 and applied to control grid 25. In accordance with the invention, the luma control signal 23 establishes a maximum brightness level, so that the video signal 18 gives white and black and a predetermined set of grays. Electron beam emitted from the cathode 22 is then scanned across the luminescent screen 30 as previously described.

Figure 1A:
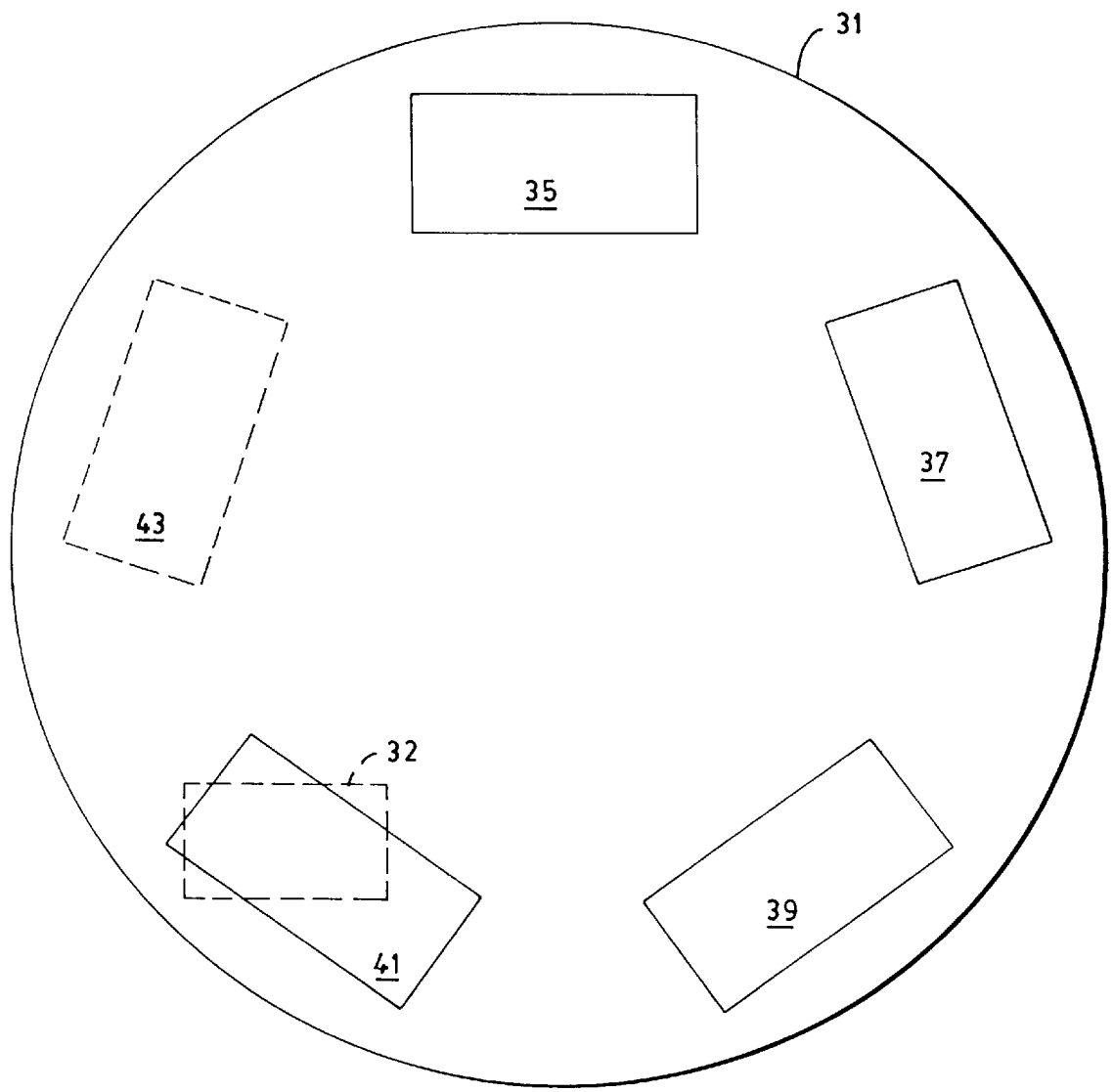
FIG. 1A shows a filter wheel typically used in the white-light printer of FIG. 1.

Light emitted from the CRT 14 passes through a filter in a filter wheel 31. The filter wheel is selectively rotatable by a motor 33 to move any of five filters in an optical path. As can be seen more particularly with reference to FIG. 1A, the filter wheel has a red filter 35, a green filter 37, a blue filter 39, a clear filter 41 and a dark filter 43. The dark filter 43 is a virtual filter in that, in practice, it is a solid section integral with the filter wheel and simply blocks light penetration. An alternative embodiment of the invention omits the dark filter 43 an simply shuts off the CRT 14 to eliminate light.

A colored light beam that passes through a colored filter is then projected through optics 19 in a camera back 17 such that it exposes the photosensitive medium 16, thus creating an image thereon. The camera back 17 can be any of various camera backs using any of various film formats, but must be mechanically and optically compatible with the color film recorder. the camera back of the preferred embodiment is the Ricoh 35 millimeter camera back.

An electronic photosensor 32 monitors the output of the CRT 14. The electronic photosensor 32 can be any of various types sensor such as a charge-coupled device ("CCD"), an amorphous silicon detector, a crystalline silicon detector, or a photodiode, inter alia. In the preferred embodiment, an amorphous silicon detector is used.

The electronic photosensor 32 passes an analog signal representative of the output of the CRT onto an analog-to-digital converter ("A/D") 34 which has been previously calibrated with gain 36 and offset 38 values from the digital electronics 12 as will be described hereinafter. An advantage of this system is that the same or equivalent colored filter that is used to expose the photosensitive medium 16 is movable in front of the electronic photosensor 32 to determine chromatic output. Therefore, accurate determination of color output of the CRT is ensured.

A count 40 is then transmitted from the A/D 34 to the electronics 12 which is representative of the brightness of the electron beam of the CRT 14.

In order for the printer to automatically adapt to color and brightness variations, the printer 10 must first be calibrated with base values. This is performed preferably at the factory where the printer 10 is being manufactured, or a qualified service depot. This process is graphically illustrated in FIG. 2. Hardware necessary for this calibration consists of an external photocell in the optical path of the camera back, mounted in such a position that it has a "view" of the entire CRT screen Naturally, the above-described camera back 17 is first removed before inserting this external sensor.

The external sensor is a NIST (National Institute of Standards and Technology) traceable photopic light sensor which is used to establish a known light output from the CRT 14. Use of a photopic reference sensor will enable calibration to be expressed in terms of "Foot Lamberts". If a broadband radiometric reference sensor is used, calibration levels should be expressed in terms of appropriate radiometric units. Simply put, the procedure requires that light from the CRT 14 be systematically measured by the external sensor through each of the filters including white light, to define light output levels for each filter color.

The same procedure is then performed on the internal sensor 32 for each color, by rotating the filter wheel. Since the actual light level from CRT screen 30 as measured by the precision external sensor is now known, the response of the internal sensor 32 can be compensated to achieve accuracy. Therefore, the response characteristic of the internal sensor 32 as compared to the external sensor are stored in look-up tables ("LUT"'s) for the purpose of self-calibration of the White Light Printer.

Figure 2A:
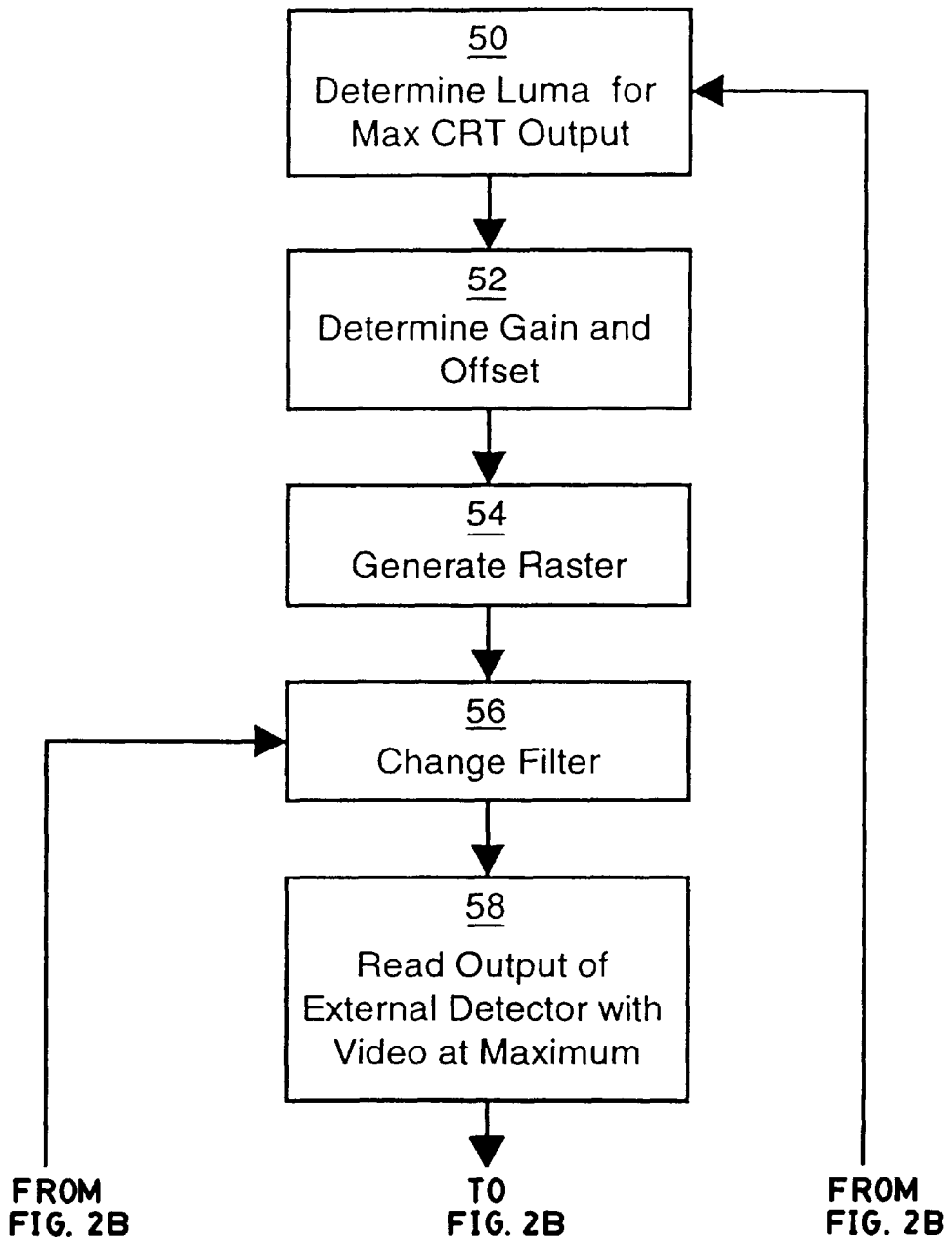
FIG. 2 shows a data flow diagram of a method of factory calibration of the printer of FIG. 1.
Figure 2B:
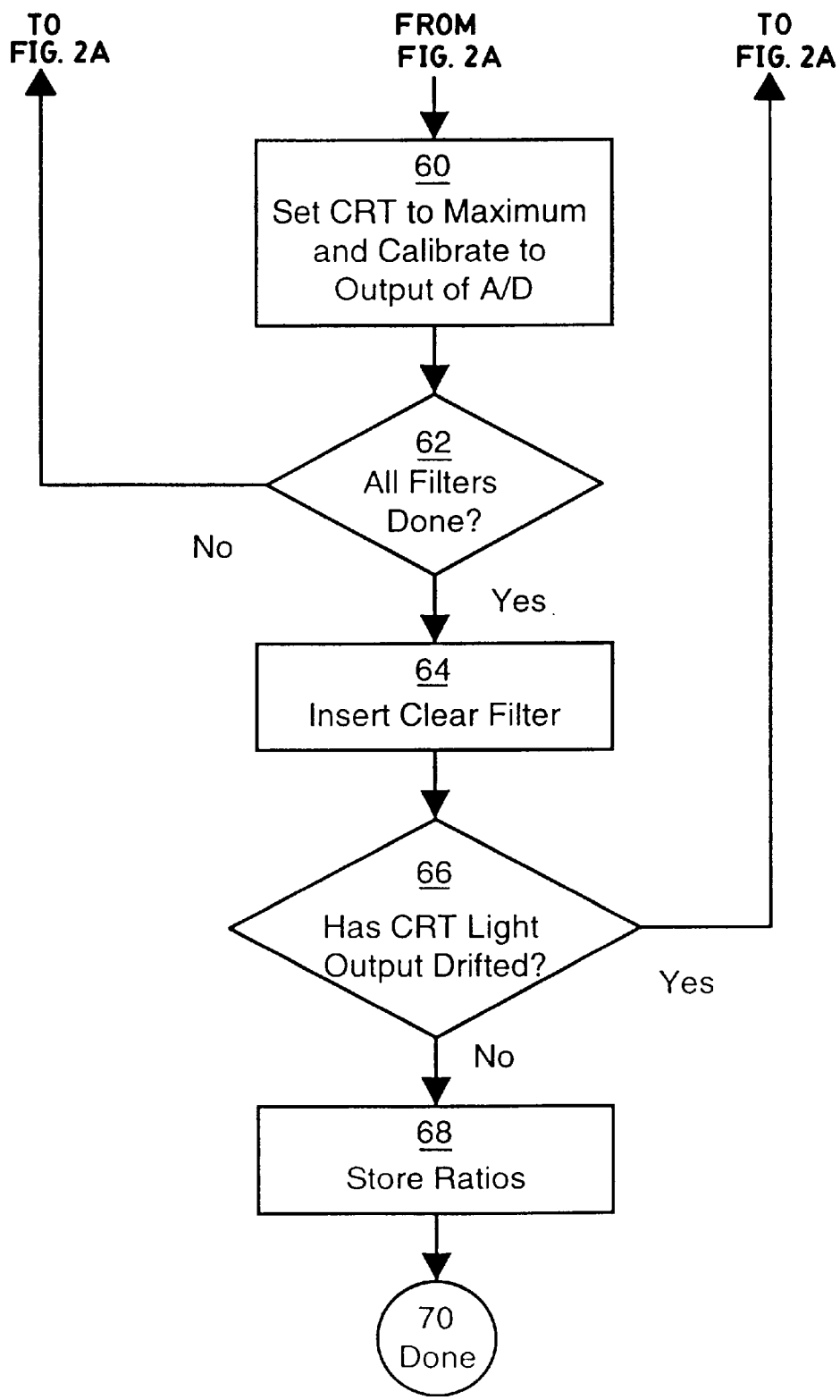

FIG. 2 elucidates this procedure by illustrating the steps taken during factory calibration. FIG. 2 shows the steps generally and, therefore, to better understand the procedure, the following table describes the steps as applied to the preferred embodiment:

| Step | Description | Filter for Internal Detector | Filter for External Detector | Luma Setting | Video Setting | A/D amplifier gain | A/D amplifier offset | Output of Internal Detector | Output of External Detector |
|---|---|---|---|---|---|---|---|---|---|
| 50 | Determine the luma that currently gives 4.5 fL on CRT | | Clear | find the value that gives 4.5 fL: "4.5 fL Luma" | max | | | | keep adjusting until this is 4.5 fL |
| 52 | Turn off CRT to calibrate the ADC amplifier offset | Clear | | max (cutoff) | zero | adjust to give zero output "ADCoff" | | "ADCoff" offset normalizes the "dark" output | |
| 52 | Set CRT at 4.5 fL and calibrate ADC amplifier gain for white light | Clear | | "4.5 fL Luma" | max | adjust to give 4.5 fL "ADC gain" | ADCoff | adjust until this is 4.5 fL (35,000 counts) | |
| 58 | Read red output at 4.5 fL white | | Red | "4.5 fl Luma" | max | | | | read Red output: "Red fL" |
| 60 | Set CRT at 4.5 fL and calibrate RED light output of ADC: Red A/D Count/Red fL | Red | | "4.5 fl Luma" | max | "ADC gain" | ADCoff | read Red ADCounts | |
| 58 | Read Green output at 4.5 fL white | | Green | "4.5 fl Luma" | max | | | | read Green output: "Green fL" |
| 60 | Set CRT at 4.5 fL and calibrate green light output of ADC: Green ADCount/ Green fL | Green | | "4.5 fl Luma" | max | "ADC gain" | ADCoff | read Green ADCounts | |
| 58 | Read Blue output at 4.5 fL white | | Blue | "4.5 fl Luma" | max | | | | read Blue output: "Blue fL" |
| 60 | Set CRT at 4.5 fL and calibrate Blue light output of ADC: Blue ADCount/ Blue fL | Blue | | "4.5 fl Luma" | max | "ADC gain" | ADCoff | read Blue ADCounts | |
| 66 | Check that the CRT light output hasn't drifted | | Clear | "4.5 fL Luma" | max | | | | check that it's still 4.5 fL- if not go to step 50 |
| 68 | Store parameters in non-volatile memory | | | | | | | | |

Stored Parameters: ADCoff, ADCgain, Red ADCount/Red fL, Green ADCount/Green fL/, Blue ADCount/Blue fL The first step is to find an input value to the CRT 14 that produces a predetermined maximum output value on the external sensor 50. The predetermined maximum output value is chosen such that neither the internal nor the external sensor will saturate at that level of light while providing sufficient dynamic range. In the preferred embodiment as can be seen in the table above, the maximum light output is 4.5 foot-Lamberts. This is achieved by setting the video input 18 to project pixels having a hexadecimal value of FFFF indicating that all of the pixels are turned on to their maximum value. A clear filter 41 is placed in front of the external sensor to measure light intensity, or brightness. Screen brightness is then adjusted to the reference brightness value.

Next, a gain and offset of the A/D 34 are set such that the dynamic range of the internal sensor 32 matches that of the external sensor. The offset is set by using the dark filter 43. The filter wheel is rotated such that a dark filter 43 is substituted for any color filters. The dark filter is referred to as a virtual filter since, in practice, it is not a filter at all. It is a continuous, integral portion of the filter wheel which blocks light. Alternatively as previously stated, video input to the CRT 14 can be turned off thus establishing a baseline condition for black within the white-light printer 10.

The current produced by the internal sensor 32 is known as the "dark current." The offset is then set to compensate for the dark current to establish the minimum value in the dynamic range. This ensures that when the sensor 32 transmits a dark current level then that A/D 34 will output zero counts digitally, thus setting a minimum value. The offset is stored as "ADCoff" as shown in the above table.

Once the minimum value is established by setting the offset, the dynamic range is established by choosing a gain that matches the designated maximum value count, to the maximum light output previously described. The gain is stored as "ADCgain."

The sensor is then calibrated for white output of the CRT 14. The electron beam is made to loop generating a raster 52 thereon. In the preferred embodiment, the raster is generated at 3 Hertz repetition rate, having sixty-four lines scanning at a velocity of 5.3 milliseconds per line.

A color filter is then rotated into a path of the light 56 between the CRT 14 and the external detector. In the preferred embodiment, the first filter used is the red filter 35. A measurement in foot-Lamberts of red light incident upon the red filter 35 is then made 58 and temporarily stored. This value is referred to by the above table as "Red fL."

The color filter is then rotated into a path of the light between the CRT 14 and the internal detector 32. Since the red filter 35 was used for the external detector, it is now used for the internal detector 32. The output of the A/D 34 is read 60 and is stored as "Red ADCounts."

If calibrations for all filters has not been completed then the previous two steps are repeated 62 for the remaining filters. That is, calibration of the internal sensor 32 is subsequently performed for the green filter 37 and the blue filter 39.

Once the calibrations are complete, the clear filter 41 is again inserted in front of the external detector 64. The CRT light output is checked 66 to determine whether over the course of calibration the light output has changed, or drifted. If a drift has occurred and it is beyond an acceptable margin, ±1%, then the entire calibration process as decried is repeated. Otherwise, ratios of the value registered on the external sensor to a value registered of the internal sensor along with the gain and offset are stored in a look-up table 68 for use by the digital circuits of 12. For example, a ratio is stored in non-volatile memory for Red ADCount/Red fL, and so on for green and blue, thus creating entries in the look-up table for each color.

The calibration process is then complete 70.

When a user of the white-light printer 10 transmits data from his/her computer to the white-light printer 10 a further step of run-time calibration is performed. The white-light printer 10 must refine chroma factors which are used to compensate the light output for variations in the CRT 14 as calibrated in the factory calibration process. The chroma factors, therefore, reflect current light and color output from the CRT 14. And, since the CRT light output changes as the white-light printer 10 ages and as the CRT warms, this process may have to be repeated occasionally as prints are made.

Figure 3A:
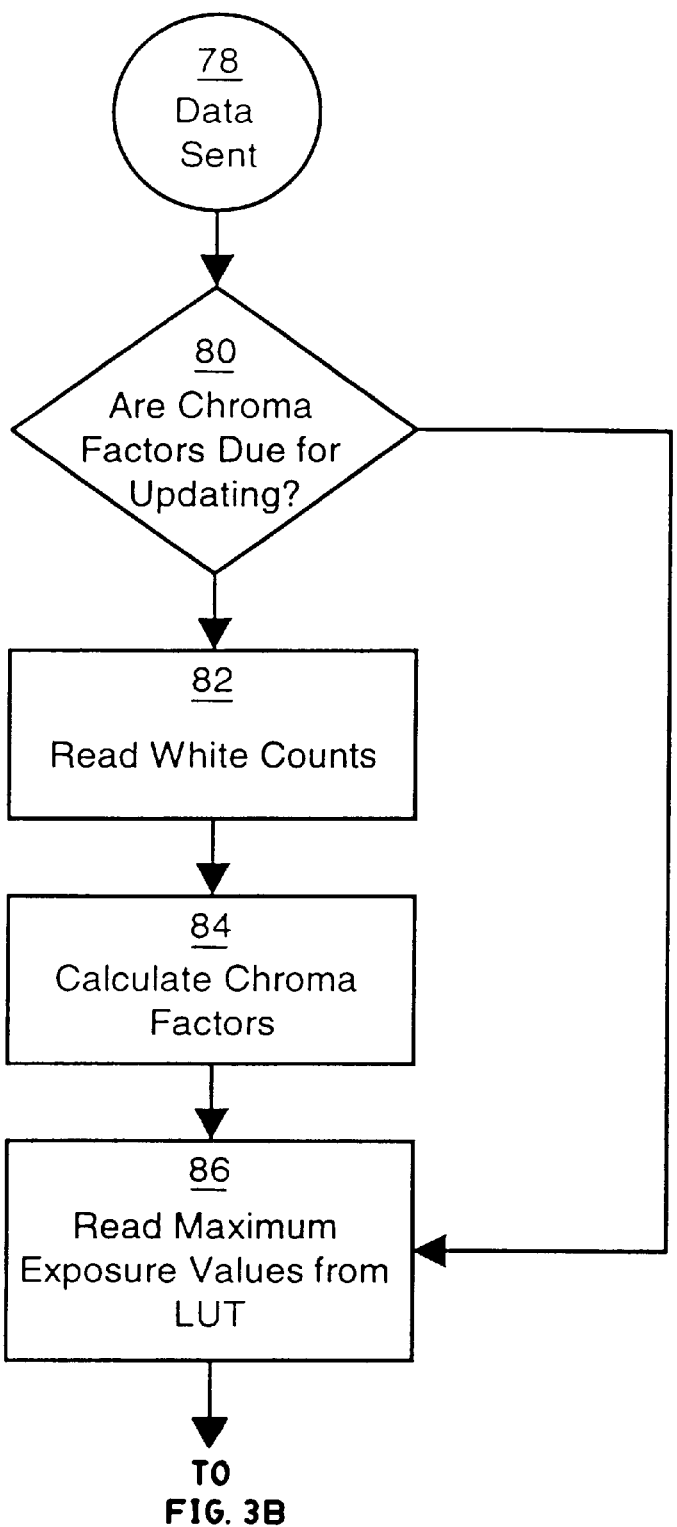
FIG. 3 is a data flow diagram of a print initiation procedure of the printer of FIG. 1 performed in accordance with the invention.
Figure 3B:
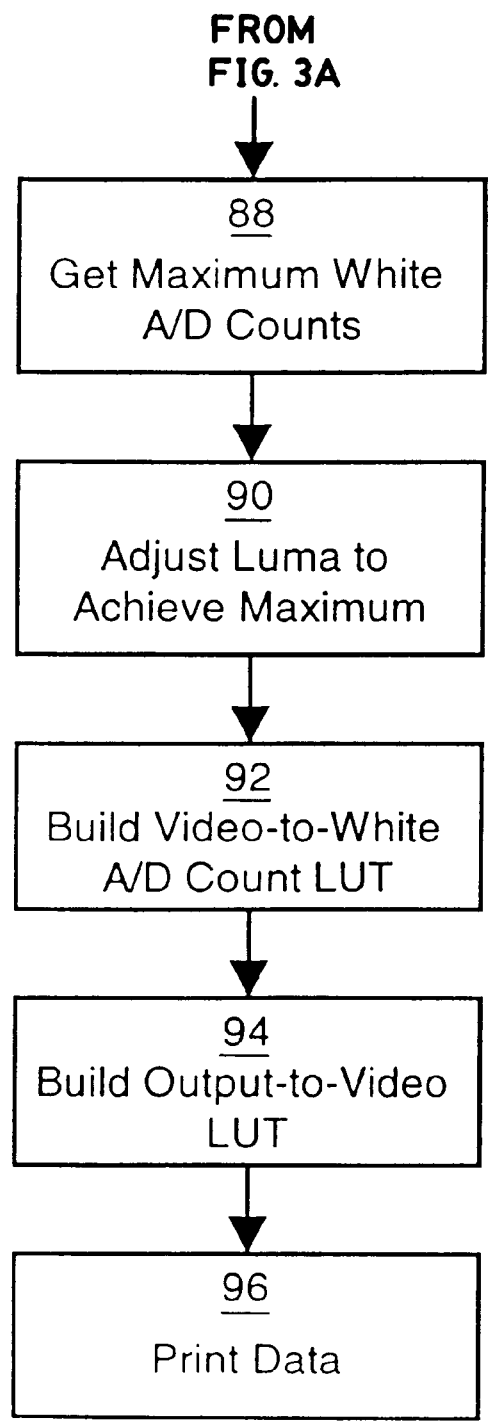
Figure 4:
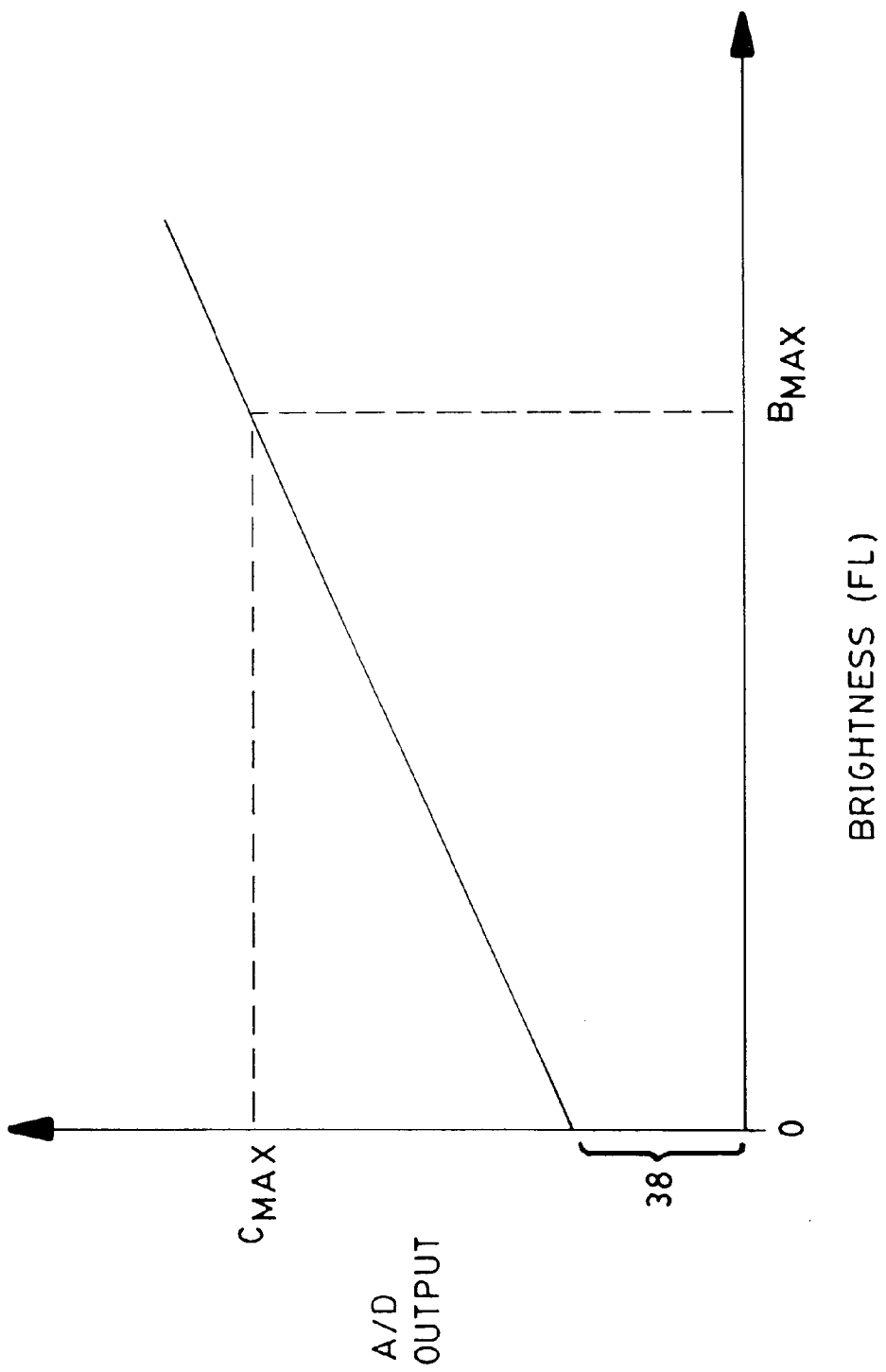
FIG. 4 is a graph representing brightness versus analog-to-digital output in the printer of FIG. 1 in accordance with the invention.

FIG. 3 shows the steps generally and, therefore, to better understand the procedure, the following table describes the steps as applied to the preferred embodiment:

| Action | Filter for Internal Detector | Luma Setting | Video Setting | A to D amplifier gain | A to D amplifier offset | Output of Internal Detector |
|---|---|---|---|---|---|---|
| 80 Check if Chroma factors are due for updating. If not, skip to #86 | | | | | | |
| 82 Read current white counts | Clear | "4.5 fL Luma" | max | "ADC gain" | ADCoff | "WhiteAD Counts" |
| 84 Calculate current value: WhiteADCounts/RedADCounts ("Red chroma factor") | Red | "4.5 fL Luma" | max | "ADC gain" | ADCoff | "RedAD Counts" |
| 84 Calculate current value: WhiteADCounts/GrnADCounts ("Grn chroma factor") | Grn | "4.5 fL Luma" | max | "ADC gain" | ADCoff | "GrnAD Counts" |
| 84 Calculate current value: WhiteADCounts/BluADCounts ("Blu chroma factor") | Blu | "4.5 fL Luma" | max | "ADC gain" | ADCoff | "BluAD Counts" |
| 86 Read maximum exposure levels required from film LUT: Red fL, Green fL, Blue fL | | | | | | |

-continued

| Action | Filter for Internal Detector | Luma Setting | Video Setting | A to D amplifier gain | A to D amplifier offset | Output of Internal Detector |
|---|---|---|---|---|---|---|
| 88 Get the maximum white ADCounts required. This is the max of Red fL * RedADCounts/Red_fL * WhiteADCounts/RedADCounts, Grn fL * GrnADCounts/Grn_fL * WhiteADCounts/GrnADCounts, Blu fL * BluADCounts/Blu_fL * WhiteADCounts/BluADCounts | | | | | | |
| 90 Adjust Luma to achieve the maximum white ADCounts ("This Luma") | White | find "This Luma" | max | "ADC gain" | ADCoff | max white AD Counts |
| 92 Build video-to-whiteADCount LUT | White | "This Luma" | vary | "ADC gain" | ADCoff | record in video-to-white AD Counts LUT |
| 94 Build Red_fL-to-Video LUT = Red_fL * RedADCounts/Red_fL WhiteADCounts/RedADCounts video-to-whiteADCount LUT | | | | | | |
| 94 Build Grn_fL-to-Video LUT = Grn_fL * GrnADCounts/Grn_fL WhiteADCounts/GrnADCounts video-to-whiteADCount LUT | | | | | | |
| 94 Build Blu_fL-to-Video LUT = Blu_fL * BluADCounts/Blu_fL * WhiteADCounts/BluADCounts * video-to-whiteADCount LUT | | | | | | |
| 96 Print Red portion of Image using Red_fL-to-Video LUT ("Red LUT") through Red filter | | "This Luma" | set by Red LUT | | | |
| 96 Print Grn portion of Image using Grn_fL-to-Video LUT ("Grn LUT") through Green filter | | "This Luma" | set by Grn LUT | | | |
| 96 Print Blu portion of Image using Blu_fL-to-Video LUT ("Blu LUT") through Blue filter | | "This Luma" | set by Blu LUT | | | |

The first step after the data is sent 78 is to check to see if the chroma factors are current 80. Whether the chroma factors are current or not can be based upon an amount of time since the last print or the number of prints that have occurred since the last chroma factor update. In the preferred embodiment, the latter method is used.

If the chroma factors need to be updated, the "white counts" are read 82. This means that the light output of the CRT 14 is read from the A/D 34 as seen by the internal detector 32 and are placed into a variable "WhiteAD-Counts". The chroma factors are then calculated 84 by dividing WhiteADCounts by the counts from the A/D 34 representative of each color output. The provides a percentage of the white light output of each color allowing the white-light printer 10 to intelligently print each color onto the photosensitive medium 16.

There is also a look-up table that is film-type dependent. This film LUT stores data specific to the type of film being exposed and is located in memory located in the digital circuitry 12. The film LUT provides preferred exposure control information optimized for each individual film. Therefore, these values must be considered to make an optimum exposure. Thus, the maximum exposure values are read from the film LUT 86.

The next step is to get the equivalent white light exposure levels for each of the red, green, and blue portions of the image ADCounts. The maximum of these three levels sets the maximum white-light exposure needed for this image.

The next step is to adjust the luma, or brightness, to achieve this amount of white light measured in foot-Lamberts 90. Adjusting the amount of white light to maximum ensures that we can get red reds, green greens, AND blue blues, i.e., the full exposure is achieved.

With the luma still maintained to ensure a maximum white light output, a video-to-whiteADCount LUT is built 92. This LUT provides information necessary for the white-light printer 10 to relate white-light exposure levels to video 22 voltages.

A output-to-video LUT is then built 94. This LUT has entries representing the foot-Lambert values of each color as a percentage of white light from the CRT 14.

The film table foot-Lambert information can now be mapped into white light A/D counts by performing the following calculation where a red is shown, for example:

Red foot-Lamberts * Red A/D count/Redfoot-Lambert * A/D count(white)/AID count(RGB)=A/D count (white)

where the first value of foot-Lamberts is from the pixel to light values in the film table. The second value of A/D count of RGB is from the manufacturing calibration which includes filter variations, and a third value is from the current chroma/luma status. With this white A/D count the video settings can be obtained from the video-to-white AD count LUT and a new LUT for just red can be built redfl-to-video.

The data can now be printed 96 by sequentially imaging each color of the data onto a single line. The data is compensated by the output-to-video LUT thus compensating for the printer hardware and output film-type thereby presenting data optimized for best printer performance.

In an alternative embodiment, after each time the chroma factors are updated values in a drift table are updated. The drift table is representative of changes in the A/D counts per delay cycle as a function of high luma and color. When the drift values fall below 2% per update, then updates are performed less frequently. Falling below 2% per minute is the preferred value representative of the CRT 14 being fully warmed-up. This drift per minute table can also be used to implement a feed-forward luminance correction between lines during the exposure such that the printer would be available sooner.

FIG. 5 illustrates graphically the brightness versus A/D count that has been referred to throughout this disclosure. A brightness maximum $B_{MAX}$ is illustrated and is six foot-Lamberts in the preferred embodiment. This is mapped to a maximum count $C_{MAX}$, which is, in the preferred embodiment, 35,000 counts. The y intercept of the graph is the offset 38 and the slope of the graph is the gain 36. Having established this graph for an individual exposure, the printer 10 is now able to consistently and accurately expose the photosensitive medium 16.

The implementation as described, involves the use of red, green, and blue as primary exposure colors. The same principles apply to any set of primary exposure colors or wavelengths.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. A white-light printer for printing an image from a computer onto a photosensitive medium where said printer automatically compensates for chromatic variations to optimize a printed image onto a photosensitive medium, said white light printer comprising:

processing means for receiving an image signal representative of the image and generating a light signal representative of a color component of the image compensated by color compensation factors for exposure of the photosensitive medium;

a light source in electrical communication with said processing means for projecting said color component as image-bearing light according to the light signal;

a rotatable filter wheel for selectively placing a filter associated with said color component into an optical path between said light source and said photosensitive medium; and sensor means disposed behind said filter wheel means for determining chromatic variations prior to exposing the photosensitive medium by measuring light output of light source through the for each color and determining the compensation factors associated with each color.

2. The white-light printer according to claim 1 wherein said filter wheel places a first filter in front of said sensor means to determine a compensation factor for said first filter such that said first filter is then placed in the optical path by said filter wheel to optimally expose the photosensitive medium.

3. The white-light printer according to claim 1 wherein said light source comprises a cathode ray tube.

4. The white-light printer according to claim 1 wherein said sensor means comprises a charge-coupled device.

5. The white-light printer according to claim 1 wherein said sensor means comprises an amorphous silicon detector.

6. A method of compensating the color response of a light source in a white light printer where the light source is adapted to project modulated light through a filter to illuminate a color image onto a photosensitive medium, said method comprising the steps of:

sequentially setting the filter between the light source and an internal light sensor to a primary color and projecting the modulated light beam therethrough;

measuring a response by said internal detector to each of the primary colors;

using the response of said internal detector to individually correct exposure levels of each of the primary colors thereby adjusting color response;

setting the filter between the light source and said internal light sensor to a substantially transparent state and projecting the modulated light beam therethrough;

measuring a single value of a plurality of video brightness values; and equating one or more video brightness values to a predetermined digital values to define a brightness range thereby providing an optimum match between the brightness range and the digital output.

7. The method according to claim 6 further comprising the step of setting a gain in an analog-to-digital converter such that digital output is spread across the brightness range.

8. The method according to claim 6 further comprising the step of monitoring drift in the one or more video brightness values and automatically compensating for the drift without re-measuring the one or more video brightness values.

9. A method of compensating the color response of a light source in a white light printer where the light source is adapted to project modulated light through a filter to illuminate a color image onto a photosensitive medium, said method comprising the steps of:

setting the filter between the light source and an internal light sensor and projecting the modulated light beam therethrough;

measuring one or more video brightness values;

equating said one or more video brightness values to digital values to define a color brightness range; and, setting a gain in an analog-to-digital converter such that digital output is spread across the color brightness range thereby providing an optimum match between the brightness range and the digital output.

* * * * *